United States Patent
Patel et al.

(10) Patent No.: US 8,185,882 B2
(45) Date of Patent: *May 22, 2012

(54) JAVA VIRTUAL MACHINE HARDWARE FOR RISC AND CISC PROCESSORS

(75) Inventors: Mukesh K Patel, Fremont, CA (US);
Jay Kamdar, Cupertino, CA (US);
Veeraganti R. Ranganath, Saratoga, CA (US)

(73) Assignee: Nazomi Communications Inc., Santa Clara, CA (US)

( * ) Notice: Subject to any disclaimer, the term of this patent is extended or adjusted under 35 U.S.C. 154(b) by 1406 days.

This patent is subject to a terminal disclaimer.

(21) Appl. No.: 11/353,432

(22) Filed: Feb. 14, 2006

(65) Prior Publication Data

US 2006/0200801 A1   Sep. 7, 2006

Related U.S. Application Data

(63) Continuation of application No. 09/938,886, filed on Aug. 24, 2001, now Pat. No. 7,080,362, which is a continuation of application No. 09/208,741, filed on Dec. 8, 1998, now Pat. No. 6,332,215.

(51) Int. Cl.
*G06F 9/45* (2006.01)
(52) U.S. Cl. ........ 717/153; 717/118; 717/152; 711/125; 711/132
(58) Field of Classification Search .................. 717/118, 717/139, 148; 712/208–213
See application file for complete search history.

(56) References Cited

U.S. PATENT DOCUMENTS

| | | | |
|---|---|---|---|
| 3,889,243 A | 6/1975 | Drimak | |
| 4,236,204 A | 11/1980 | Groves | |
| 4,334,269 A * | 6/1982 | Shibasaki et al. | 712/202 |
| 4,524,416 A | 6/1985 | Stanley et al. | |
| 4,587,612 A | 5/1986 | Fisk et al. | |
| 4,587,632 A | 5/1986 | Ditzel | |
| 4,631,663 A | 12/1986 | Chilinski et al. | |
| 4,763,255 A | 8/1988 | Hopkins et al. | |
| 4,783,738 A | 11/1988 | Li et al. | |
| 4,860,191 A | 8/1989 | Nomura et al. | |
| 4,922,414 A | 5/1990 | Holloway et al. | |
| 4,961,141 A | 10/1990 | Hopkins et al. | |
| 4,969,091 A | 11/1990 | Muller | |
| 5,077,657 A | 12/1991 | Cooper et al. | |
| 5,113,522 A | 5/1992 | Dinwiddie, Jr. et al. | |
| 5,136,696 A | 8/1992 | Beckwith et al. | |
| 5,142,681 A | 8/1992 | Driscoll et al. | |
| 5,163,139 A | 11/1992 | Haigh et al. | |

(Continued)

OTHER PUBLICATIONS

N. Ranganathan et al, "Object-Oriented Architectural Support for a Java Processor", 1998, University of South Florida, [JavaProcessor-Ranganathan.pdf 26 pages].*

(Continued)

*Primary Examiner* — Anna Deng
*Assistant Examiner* — Matthew Brophy
(74) *Attorney, Agent, or Firm* — Hahn Moodley LLP; Vani Moodley, Esq.

(57) ABSTRACT

A hardware Java accelerator is provided to implement portions of the Java virtual machine in hardware in order to accelerate the operation of the system on Java bytecodes. The Java hardware accelerator preferably includes Java bytecode translation into native CPU instructions. The combination of the Java hardware accelerator and a CPU provides a embedded solution which results in an inexpensive system to run Java programs for use in commercial appliances.

18 Claims, 9 Drawing Sheets

U.S. PATENT DOCUMENTS

| | | | |
|---|---|---|---|
| 5,193,180 | A | 3/1993 | Hastings |
| 5,201,056 | A | 4/1993 | Daniel et al. |
| 5,218,711 | A | 6/1993 | Yoshida |
| 5,241,636 | A | 8/1993 | Kohn |
| 5,265,206 | A | 11/1993 | Shackelford et al. |
| 5,307,492 | A | 4/1994 | Benson |
| 5,313,614 | A | 5/1994 | Goettelmann et al. |
| 5,333,296 | A | 7/1994 | Bouchard et al. |
| 5,335,344 | A | 8/1994 | Hastings |
| 5,355,460 | A | 10/1994 | Eickemeyer et al. |
| 5,361,334 | A * | 11/1994 | Cawley ............... 709/243 |
| 5,430,862 | A | 7/1995 | Smith et al. |
| 5,481,684 | A | 1/1996 | Richter et al. |
| 5,490,256 | A | 2/1996 | Mooney et al. |
| 5,535,329 | A | 7/1996 | Hastings |
| 5,542,059 | A | 7/1996 | Blomgren |
| 5,574,927 | A | 11/1996 | Scantlin |
| 5,577,233 | A | 11/1996 | Goettelmann et al. |
| 5,584,026 | A | 12/1996 | Knudsen et al. |
| 5,619,665 | A | 4/1997 | Phillip |
| 5,619,666 | A | 4/1997 | Coon et al. |
| 5,634,118 | A | 5/1997 | Blomgren |
| 5,638,525 | A | 6/1997 | Hammond et al. |
| 5,650,948 | A | 7/1997 | Gafter |
| 5,659,703 | A | 8/1997 | Moore et al. |
| 5,668,999 | A | 9/1997 | Gosling |
| 5,692,170 | A | 11/1997 | Isaman et al. |
| 5,740,441 | A | 4/1998 | Yellin et al. |
| 5,740,461 | A | 4/1998 | Jaggar |
| 5,748,964 | A | 5/1998 | Gosling |
| 5,752,035 | A | 5/1998 | Trimberger |
| 5,761,477 | A | 6/1998 | Wahbe et al. |
| 5,764,908 | A | 6/1998 | Shoji et al. |
| 5,768,593 | A | 6/1998 | Walters et al. |
| 5,774,868 | A | 6/1998 | Cragun et al. |
| 5,778,178 | A | 7/1998 | Arunachalam |
| 5,781,750 | A | 7/1998 | Blomgren et al. |
| 5,784,584 | A | 7/1998 | Moore et al. |
| 5,794,068 | A | 8/1998 | Asghar et al. |
| 5,805,895 | A | 9/1998 | Breternitz, Jr. et al. |
| 5,809,336 | A | 9/1998 | Moore et al. |
| 5,838,165 | A | 11/1998 | Chatter |
| 5,838,948 | A | 11/1998 | Bunza |
| 5,875,336 | A * | 2/1999 | Dickol et al. ............ 717/143 |
| 5,889,996 | A | 3/1999 | Adams |
| 5,898,850 | A | 4/1999 | Dickol et al. |
| 5,898,885 | A | 4/1999 | Dickol et al. |
| 5,903,761 | A | 5/1999 | Tyma |
| 5,905,895 | A | 5/1999 | Halter |
| 5,920,720 | A * | 7/1999 | Toutonghi et al. ........ 717/148 |
| 5,923,892 | A | 7/1999 | Levy |
| 5,925,123 | A | 7/1999 | Tremblay et al. |
| 5,926,832 | A | 7/1999 | Wing et al. |
| 5,937,193 | A | 8/1999 | Evoy |
| 5,953,736 | A | 9/1999 | O'Connor et al. |
| 5,953,741 | A | 9/1999 | Evoy |
| 5,970,249 | A * | 10/1999 | Holzle et al. ............ 717/153 |
| 5,983,334 | A | 11/1999 | Coon et al. |
| 5,999,731 | A | 12/1999 | Yellin et al. |
| 6,003,038 | A | 12/1999 | Chen et al. |
| 6,009,499 | A | 12/1999 | Koppala |
| 6,014,723 | A | 1/2000 | Tremblay et al. |
| 6,021,469 | A * | 2/2000 | Tremblay et al. ......... 711/125 |
| 6,026,485 | A * | 2/2000 | O'Connor et al. ........ 712/226 |
| 6,031,992 | A | 2/2000 | Cmelik et al. |
| 6,038,643 | A | 3/2000 | Tremblay et al. |
| 6,052,526 | A | 4/2000 | Chatt |
| 6,065,108 | A | 5/2000 | Tremblay et al. |
| 6,067,577 | A | 5/2000 | Beard |
| 6,071,317 | A | 6/2000 | Nagel |
| 6,075,940 | A | 6/2000 | Gosling |
| 6,075,942 | A * | 6/2000 | Cartwright, Jr. .......... 717/138 |
| 6,076,141 | A | 6/2000 | Tremblay et al. |
| 6,081,665 | A * | 6/2000 | Nilsen et al. ............. 717/116 |
| 6,085,198 | A | 7/2000 | Skinner et al. |
| 6,085,307 | A * | 7/2000 | Evoy et al. .............. 712/31 |
| 6,108,768 | A | 8/2000 | Koppala et al. |
| 6,110,226 | A * | 8/2000 | Bothner ................ 717/153 |
| 6,118,940 | A | 9/2000 | Alexander, III et al. |
| 6,122,638 | A | 9/2000 | Huber et al. |
| 6,125,439 | A * | 9/2000 | Tremblay et al. ......... 712/202 |
| 6,131,144 | A | 10/2000 | Koppala |
| 6,131,191 | A | 10/2000 | Cierniak et al. |
| 6,139,199 | A | 10/2000 | Rodriguez |
| 6,141,794 | A | 10/2000 | Dice et al. |
| 6,148,391 | A | 11/2000 | Petrick |
| 6,151,702 | A | 11/2000 | Overturf et al. |
| 6,158,048 | A | 12/2000 | Lueh et al. |
| 6,167,488 | A | 12/2000 | Koppala |
| 6,170,083 | B1 * | 1/2001 | Adl-Tabatabai ............ 717/158 |
| 6,209,077 | B1 | 3/2001 | Robertson et al. |
| 6,212,604 | B1 * | 4/2001 | Tremblay ............... 711/125 |
| 6,233,678 | B1 | 5/2001 | Bala |
| 6,249,861 | B1 * | 6/2001 | Tremblay et al. ......... 712/204 |
| 6,275,903 | B1 | 8/2001 | Koppala et al. |
| 6,275,984 | B1 | 8/2001 | Morita |
| 6,292,883 | B1 * | 9/2001 | Augusteijn et al. ........ 712/209 |
| 6,292,935 | B1 * | 9/2001 | Lueh et al. .............. 717/148 |
| 6,298,434 | B1 | 10/2001 | Lindwer |
| 6,317,872 | B1 * | 11/2001 | Gee et al. ............... 717/152 |
| 6,321,323 | B1 | 11/2001 | Nugroho et al. |
| 6,324,686 | B1 * | 11/2001 | Komatsu et al. .......... 717/148 |
| 6,330,659 | B1 | 12/2001 | Poff et al. |
| 6,349,377 | B1 | 2/2002 | Lindwer |
| 6,374,286 | B1 * | 4/2002 | Gee et al. ............... 718/108 |
| 6,532,531 | B1 | 3/2003 | O'Connor et al. |
| 6,606,743 | B1 | 8/2003 | Raz et al. |
| 6,901,591 | B1 * | 5/2005 | Sokolov ................ 718/1 |
| 7,080,362 | B2 * | 7/2006 | Patel et al. .............. 717/139 |
| 7,478,224 | B2 * | 1/2009 | Strom et al. ............. 712/209 |
| 2002/0078115 | A1 | 6/2002 | Poff et al. |
| 2003/0115238 | A1 * | 6/2003 | O'Connor et al. ......... 709/100 |

OTHER PUBLICATIONS

Andrews, et al., "Migrating a CISC computer family onto RISC via object code translation", *Proceedings of the Fifth International Conference on Architectural Support for Programming Languages and Operating Systems*, 1992.

Berekovic, et al., "Hardware Realization of a Java Virtual Machine for High Performance Multimedia Applications", *IEEE Workshop on Signal Processing Systems 1997*, Jan. 1, 1997.

Debaere, et al., "Interpretation and Instruction Path Coprocessing", *The MIT Press*, (Jan. 1, 1990).

Deutsch, Peter, et al., "Efficient Implementation of the Smalltalk-80 System", *11th ACM SIGACT-SIGPLAN Symposium on Principles of Programming Languages*, 1984.

El-Kharashi, et al., "Java Microprocessor: Computer Architecture Implications,", *IEEE*, (Aug. 20, 1997).

Ertl, "A new approach to forth native code generation", *EuroForth Conference Proceedings*, 1992.

Ertl, "Implementation of stack-based languages on register machines", *dissertation*, Apr. 1996.

Ertl, "Stack caching for interpreters", *SIGPLAN*, 1995.

Ertl, "Stack caching for interpreters", *EuroForth Conference Proceedings*, 1994.

Glossner, et al., "Delft-Java Link Translation Buffer", *Proceedings of the 24th EUROMICRO conference*, Aug. 1998.

Glossner, et al., "The Delft Java Engine: An Introduction, Euro-Part '97, Parallel Processing, Third International Euro-Par Conference", (Aug. 1, 1997).

Hsieh, et al., "Java Byte Code to Native Code Translation: The Caffeine Prototype and Preliminary Results", *IEEE*, (Jan. 1, 1996).

Infoworld, "SGI Webforce 02 is a one-stop web authoring platform", *Infoworld* Jan. 20th 1997.

Interactive Daily, "Sun Says Java Chips Will Vastly Increase Speed, Reduce Costs to Run Java Programs", *Download From Internet*, (Dec. 1996).

Kieburtz, "A RISC architecture for symbolic computation", *ACM* 1987.

Krall, et al., "A 64 bit Java VM just-intime compiler", XP-002117590, 1997.

Krall, Andreas, "Efficient Java VM Just-In-Time Compilation", *IEEE*, (Jan. 1, 1998).

Mahlke, et al., "A Comparison of Full and Partial Predicted Execution Support for ILP Processors", *IEEE*, (Jan. 1, 1995).

Maierhofer, et al., "Optimizing stack code", *Forth-Tagung*, 1997.

McGhan, et al., "picoJava: A Direct Execution Engine for Java Bytecode", *IEEE*, 1998.

Miyoshi, et al., "Implementation and Evaluation of Real Time Java Threads", *IEEE*, (Jan. 1, 1997).

O'Conner, et al., "picoJava-I: The Java Virtual Machine in Hardware", *IEEE*, Mar. 1997.

Pang, et al., "Providing Soft Real-Time QoS Guarantees for Java Threads", *ACM*, (Jan. 1, 2001).

Radhakrishnan, et al., "Improving Java Performance Using Hardware Translation", *ACM*, (Jan. 1, 2001).

Rose, A C., "Hardware Java Accelerator for the ARM 7", *4th Year Undergraduate Project in Group D*, (1996/97),1-49, Appendix.

Steensgarrd, et al., "Object and Native Code Thread Mobility Among Heterogeneous Computers", *ACM*, (Jan. 1, 1995).

Steinbusch, Otto, "Designing Hardware to Interpret Virtual Machine Instructions", *Dept. of Electrical Engineering, Eindhoven University of Technology, Masters Degree Thesis*, Feb. 1998, (Jan. 1, 1998),59.

Sun Microsystems, "PicoJava 1 Microprocessor Core Architecture", Oct. 1996.

Sun Microsystems, "PicoJava I, Java Processor Core Data Sheet", Dec. 1997.

Tomasulo, R., "An Efficient Algorithm for Exploring Multiple Arithmetic Units", *IBM Journal of Research and Development*, Jan. 1, 1967.

Ungar, et al., "Architecture of SOAR: Smalltalk on a RISC", *11th Symposium on Computer Architecture,* Jun. 1984, (Jun. 1, 1984).

Watanabe, et al., "Exploiting Java Instruction/Thread Level Parallelism With Horizontal Mutithreading", *IEEE*, (Jan. 1, 2001).

Fiasconaro,Microarchitecture of the HP9000 Series 500 CPU, Hewlett-Packard Co, Systems Technology Operation, Fort Collins, Colorado.

Vijaykrishnan et al, Object-Orientated Architecture Support for a Java Processor, Center for Microelectronics Research, Dept of Computer Science and Engg, Univ of S. Florida, Tampa, Bell South Communications, Birmingham, Alabama.

Kim et al, Designing a Java Microprocessor Core Using FPGA Technology, Lucent Technologies and Illinois Institute of Technology, 1998 IEEE Xplore.

Andrews et al. Migrating a CISC Computer Family onto RISC via Object Code Translation, Tandem Computers Inc, Cupertino, CA, 1992 ACM.

O'Connor et al, PicoJava-1:The Java Virtual Machine in Hardware, Sun Microelectronics,Mar./Apr. 1997 IEEE Micro.

Ebcioglu et al, A Java ILP Machine Based on Fast Dynamic Compilation, IBM T.J. Watson Research Center, NY.

Greve, The World's First Java Processor, Advanced Technology Center, Rockwell Collins, Inc.

Advanced Logic Corporation, Tiny2 J Functional Specification, San Jose, CA.

Imsys AB, A Microcoded Stack Machine, Sweden, Per Alm Data AB, Sweden.

* cited by examiner

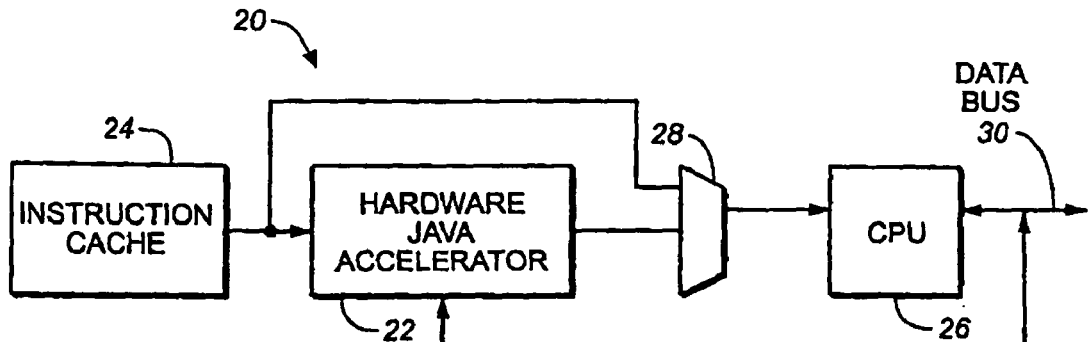
FIG._1
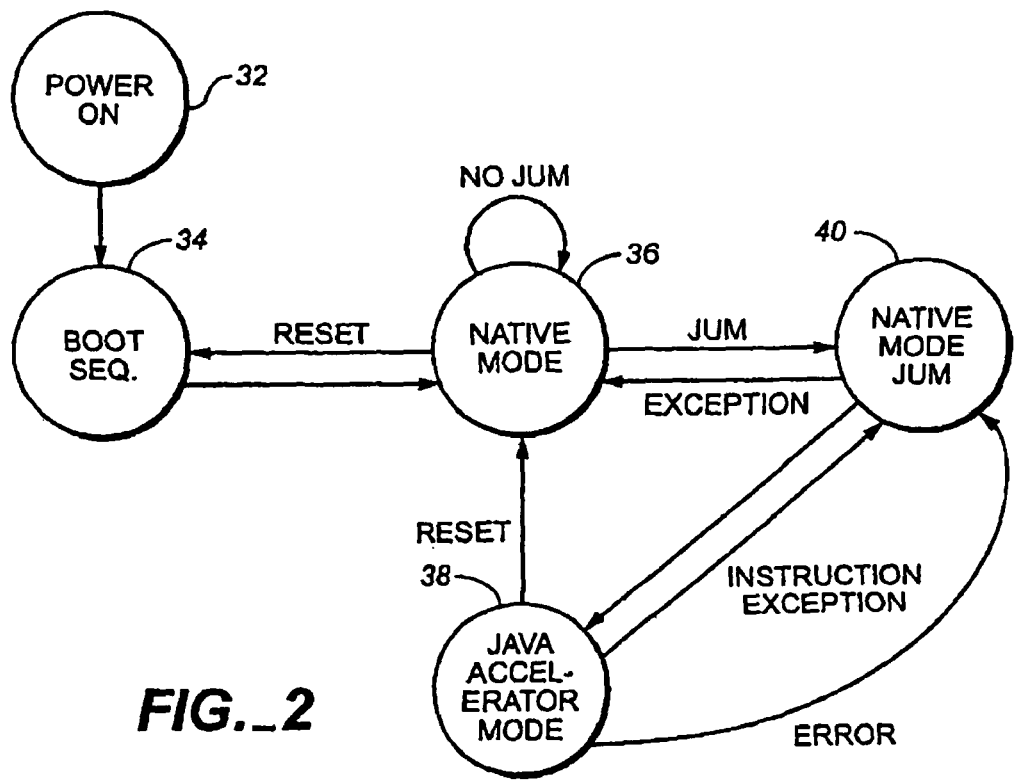
FIG._2

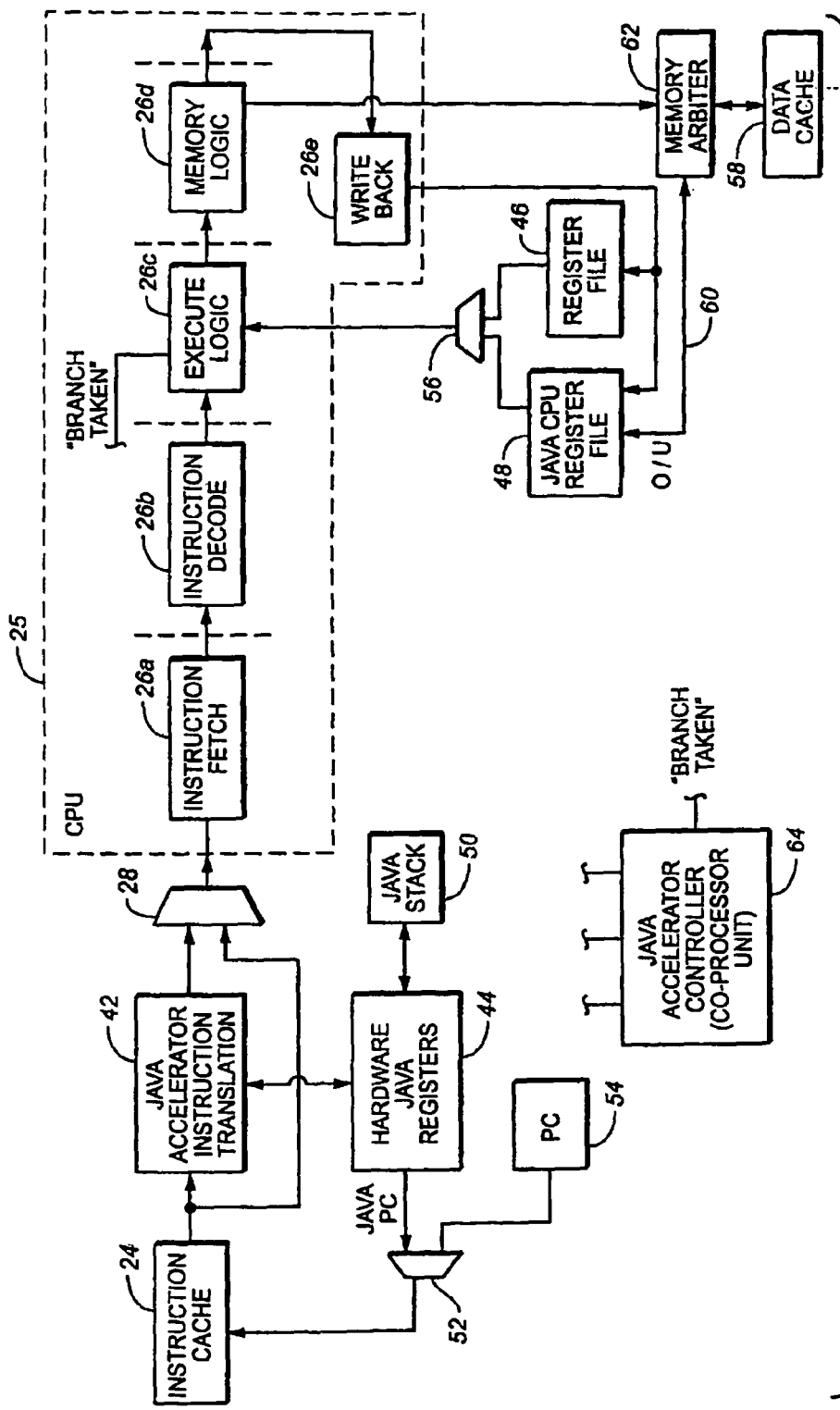
FIG._3

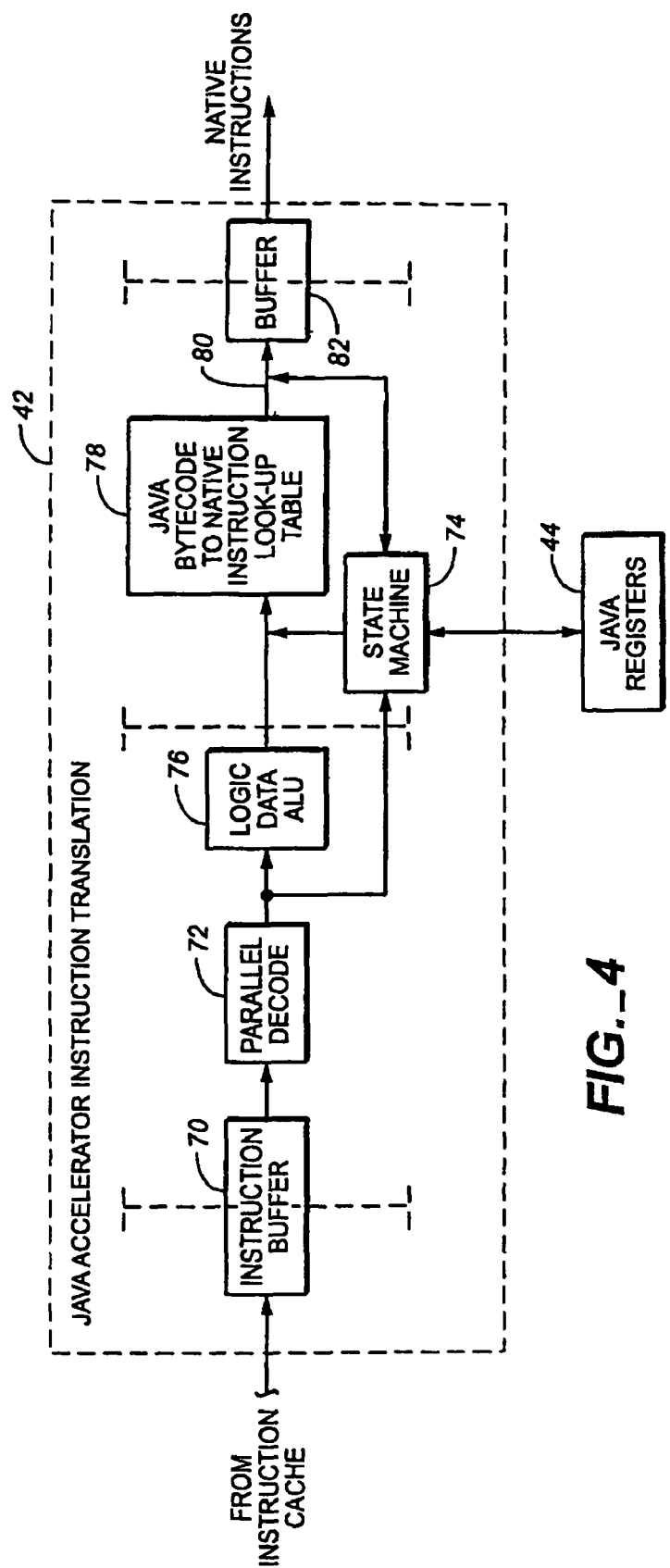
FIG._4

I. INSTRUCTION TRANSLATION

| JAVA BYTECODE | ⇨ | NATIVE INSTRUCTION |
|---|---|---|
| iadd | | ADD R1, R2 |

II. JAVA REGISTER

PC = VALUE A                    PC = VALUE A + 1
OPTOP = VALUE B      ⇨         OPTOP = VALUE B - 1
     (R1)                              (R2)
VAR = VALUE C                   VAR = VALUE C

III. JAVA CPU REGISTER FILE

```
                         R0  0001                              R0  0001
CONTAINS VALUE  → R1  0150       NOT A VALID    R1  0150
      OF TOP OF        R2  1210       STACK VALUE  →
OPERAND STACK      R3  0007       CONTAINS VALUE → R2  1360
                         R4  0005       OF THE TOP OF      R3  0007
                         R5  0006       OPERAND STACK    R4  0005
CONTAINS FIRST → R6  1221                              R5  0006
      VARIABLE        R7  1361                              R6  1221
                                                              R7  1361
```

IV. MEMORY

```
OPTOP = VALUE B →  - 0150                              - 0150
      (VALUE B - 1) - 1210       OPTOP = VALUE B - 1 - 1360
                       - 0007                              - 0007
                       - 0005                              - 0005
                       - 0006                              - 0006
                       - 0001                              - 0001
                       - 4427                              - 4427

VAR = VALUE C  - 1221       VAR = VALUE C  - 1221
                       - 1361                              - 1361
                       - 1101                              - 1101
```

FIG._5

I. INSTRUCTION TRANSLATION

| JAVA BYTECODE | | NATIVE INSTRUCTION |
|---|---|---|
| iload_n<br>iadd | ⇨ | ADD R6, R1 |

II. JAVA REGISTER

| | | |
|---|---|---|
| PC = VALUE A<br>OPTOP = VALUE B<br>(R1)<br>VAR = VALUE C | ⇨ | PC = VALUE A + 2<br>OPTOP = VALUE B<br>(R1)<br>VAR = VALUE C |

III. JAVA CPU REGISTER FILE

|  |  |  |  |
|---|---|---|---|
| | R0 0001 | | R0 0001 |
| CONTAINS → | R1 0150 | CONTAINS → | R1 1371 |
| VALUE OF | R2 1210 | VALUE OF | R2 1210 |
| TOP OF | R3 0007 | TOP OF | R3 0007 |
| OPERAND STACK | R4 0005 | STACK | R4 0005 |
| | R5 0006 | | R5 0006 |
| CONTAINS FIRST → | R6 1221 | CONTAINS → | R6 1221 |
| VARIABLE | R7 1361 | FIRST<br>VARIABLE | R7 1361 |

IV. MEMORY

| | | | |
|---|---|---|---|
| OPTOP = VALUE B → | - 0150 | OPTOP = VALUE B | - 1371 |
| | - 1210 | | - 1210 |
| | - 0007 | | - 0007 |
| | - 0005 | | - 0005 |
| | - 0006 | | - 0006 |
| | - 0001 | | - 0001 |
| | - 4427 | | - 4427 |
| VAR = VALUE C | - 1221 | VAR = VALUE C | - 1221 |
| | - 1361 | | - 1361 |
| | - 1101 | | - 1101 |

*FIG._6*

| Opcodes Mnemonic | Opcode xHH | Excep Gen |
|---|---|---|
| nop | 0x00 | |
| aconst_null | x01 | |
| iconst_m1 | x02 | |
| iconst_n(0-5) | x03 - x08 | |
| iconst_n(0-1) | x09 - x0a | |
| fconst_n(0-2) | x0c - x0d | |
| dconst_n(0-1) | x0e - x0f | |
| bipush | x10 | |
| sipush | x11 | |
| ldc | x12 | y |
| ldc_w | x13 | y |
| ldc2_w | x14 | y |
| iload | x15 | |
| lload | x16 | |
| fload | x17 | |
| dload | x18 | |
| aload | x19 | |
| iload_n(0-3) | x1a - x1d | |
| lload_n(0-3) | x1e - x21 | |
| fload_n(0-3) | x22 - x25 | |
| dload_n(0-3) | x26 - x29 | |
| aload_n(0-3) | x2a - x2d | |
| iaload | x2e | |
| laload | x2f | |
| faload | x30 | |
| daload | x31 | |
| aaload | x32 | |
| baload | x33 | |
| caload | x34 | |
| saload | x35 | |
| istore | x36 | |
| lstore | x37 | |
| fstore | x38 | |
| dstroe | x39 | |
| astroe | x3a | |
| istore_n(0-3) | x3b - x3e | |
| lstore_n(0-3) | x3f - x42 | |
| fstore_n(0-3) | x43 - x46 | |
| dstore_n(0-3) | x47 - x4a | |
| astore_n(0-3) | x4b - x4e | |
| iastore | x4f | |
| lastore | x50 | |
| fastroe | x51 | |
| dastore | x52 | |
| bastore | x53 | |
| aastore | x54 | |
| castroe | x55 | |
| sastore | x56 | |

FIG._7A

| | | |
|---|---|---|
| pop | x57 | |
| pop2 | x58 | |
| dup | x59 | |
| dup_x1 | x5a | |
| dup_x2 | x5b | |
| dup2 | x5c | |
| dup2_x1 | x5d | |
| dup2_x2 | x5e | |
| swap | x5f | |
| iadd | x60 | |
| ladd | x61 | |
| fadd | x62 | y |
| dadd | x63 | y |
| isub | x64 | |
| lsub | x65 | |
| fsub | x66 | y |
| dsub | x67 | y |
| imul | x68 | |
| lmul | x69 | |
| fmul | x6a | y |
| dmul | x6b | y |
| idiv | x6c | y |
| ldiv | x6d | y |
| fdiv | x6e | y |
| ddiv | x6f | y |
| irem | x70 | y |
| lrem | x71 | y |
| frem | x72 | y |
| drem | x73 | y |
| ineg | x74 | |
| lneg | x75 | |
| fneg | x76 | y |
| dneg | x77 | y |
| ishl | x78 | |
| lshl | x79 | |
| ishr | x7a | |
| lshr | x7b | |
| iushr | x7c | |
| lushr | x7d | |
| iand | x7e | |
| land | x7f | |
| ior | x80 | |
| lor | x81 | |
| ixor | x82 | |
| lxor | x83 | |
| iinc | x84 | |
| i2l | x85 | y |
| i2f | x86 | y |
| i2d | x87 | y |
| l2i | x88 | y |
| l2f | x89 | y |
| l2d | x8a | y |

FIG._7B

| | | |
|---|---|---|
| f2i | x8b | y |
| f2l | x8c | y |
| f2d | x8d | y |
| d2i | x8e | y |
| d2l | x8f | y |
| d2f | x90 | y |
| i2b | x91 | |
| i2c | x92 | |
| i2s | x93 | |
| lcmp | x94 | y |
| fcmpl | x95 | y |
| fcmpg | x96 | y |
| dcmpl | x97 | y |
| dcmpg | x98 | y |
| ifeq | x99 | |
| ifne | x9a | |
| iflt | x9b | |
| ifge | x9c | |
| ifgt | x9d | |
| ifle | x9e | |
| if_icmpeq | x9f | |
| if_icmpne | xa0 | |
| if_icmplt | xa1 | |
| if_acmpge | xa2 | |
| if_cmpgt | xa3 | |
| if_icmple | xa4 | |
| if_acmpeq | xa5 | |
| if_acmpne | xa6 | |
| goto | xa7 | |
| jsr | xa8 | |
| ret | xa9 | |
| tableswitch | xaa | y |
| lookupswitch | xab | y |
| ireturn | xac | |
| lreturn | xad | |
| freturn | xae | |
| dreturn | xaf | |
| areturn | xb0 | |
| return | xb1 | |
| getstatic | xb2 | y |
| putstatic | xb3 | y |
| getfield | xb4 | y |
| putfield | xb5 | y |
| invokevirtual | xb6 | y |
| invokespecial | xb7 | y |
| invokestatic | xb8 | y |
| invokeinterface | xb9 | y |
| xxunusedxxx | xba | y |
| new | xbb | y |
| newarray | xbc | y |
| anewarray | xbd | y |
| arraylength | xbe | y |

FIG._7C

| | | |
|---|---|---|
| athrow | xbf | y |
| checkcast | xc0 | y |
| instanceof | xc1 | y |
| monitorenter | xc2 | y |
| monitorexit | xc3 | y |
| wide | xc4 | y |
| multianewarray | xc5 | y |
| ifnull | xc6 | y |
| ifnonnull | xc7 | y |
| goto_w | xc8 | |
| jsr_w | xc9 | |
| | | |
| ldc_quick | xcb | y |
| ldc_w_quick | xcc | y |
| ldc2_w_quick | xcd | y |
| getfield_quick | xce | y |
| putfield_quick | xcf | y |
| getfield2_quick | xd0 | y |
| putfield2_quick | xd1 | y |
| getstatic_quick | xd2 | y |
| putstatic_quick | xd3 | y |
| getstatic2_quick | xd4 | y |
| putstatic2_quick | xd5 | y |
| invokevirtual_quick | xd6 | y |
| invokenonvirtual_quick | xd7 | y |
| invokesuper_quick | xd8 | y |
| invokestatic_quick | xd9 | y |
| invokeinterface_quick | xda | y |
| invokevirtualobject_quick | xdb | y |
| new_quick | xdc | y |
| anewarray_quick | xde | y |
| multinewarray_quick | xdf | y |
| checkcast_quick | xe0 | y |
| instanceof_quick | xe1 | y |
| invokevirtual_quick_w | xe2 | y |
| getfield_quick_w | xe3 | y |
| putfield_quick_w | xe4 | y |
| | | |
| breakpoint | xca | y |
| impdep1 | xfe | y |
| impdep2 | xff | y |

FIG._7D

JAVA VIRTUAL MACHINE HARDWARE FOR RISC AND CISC PROCESSORS

RELATED APPLICATIONS

The present application is a continuation of the application entitled "Java™ Hardware Accelerator Using Microcode Engine," filed "on Aug. 24, 2001, inventor Mukesh K. Patel, et al., U.S. application Ser. No. 09/938,886 now U.S. Pat. No. 7,080,362", which is in turn a continuation-in-part of the application entitled "Java™ Virtual Machine Hardware for RISC and CISC Processors," filed Dec. 8, 1998, inventor Mukesh K. Patel, et al., U.S. application Ser. No. 09/208,741 now U.S. Pat. No. 6,332,215.

BACKGROUND OF THE INVENTION

Java™ is an object orientated programming language developed by Sun Microsystems. The Java language is small, simple and portable across platforms and operating systems, both at the source and at the binary level. This makes the Java programming language very popular on the Internet.

Java's platform independence and code compaction are the most significant advantages of Java over conventional programming languages. In conventional programming languages, the source code of a program is sent to a compiler which translates the program into machine code or processor instructions. The processor instructions are native to the system's processor. If the code is compiled on an Intel-based system, the resulting program will only run on other Intel-based systems. If it is desired to run the program on another system, the user must go back to the original source code, obtain a compiler for the new processor, and recompile the program into the machine code specific to that other processor.

Java operates differently. The Java compiler takes a Java program and, instead of generating machine code for a particular processor, generates bytecodes. Bytecodes are instructions that look like machine code, but aren't specific to any processor. To execute a Java program, a bytecode interpreter takes the Java bytecode converts them to equivalent native processor instructions and executes the Java program. The Java byte code interpreter is one component of the Java Virtual Machine.

Having the Java programs in bytecode form means that instead of being specific to any one system, the programs can run on any platform and any operating system as long a Java Virtual Machine is available. This allows a binary bytecode file to be executable across platforms.

The disadvantage of using bytecodes is execution speed. System specific programs that run directly on the hardware from which they are compiled, run significantly faster that Java bytecodes, which must be processed by the Java Virtual Machine. The processor must both convert the Java bytecodes into native instructions in the Java Virtual Machine and execute the native instructions.

One way to speed up the Java Virtual Machine is by techniques such as the "Just in Time" (JIT) interpreter, and even faster interpreters known as "Hot Spot JITs" interpreters. The JIT versions all result in a JIT compile overhead to generate native processor instructions. These JIT interpreters also result in additional memory overhead.

The slow execution speed of Java and overhead of JIT interpreters have made it difficult for consumer appliances requiring local-cost solutions with minimal memory usage and low energy consumption to run Java programs. The performance requirements for existing processors using the fastest JITs more than double to support running the Java Virtual Machine in software. The processor performance requirements could be met by employing superscalar processor architectures or by increasing the processor clock frequency. In both cases, the power requirements are dramatically increased. The memory bloat that results from JIT techniques, also goes against the consumer application requirements of low cost and low power.

It is desired to have an improved system for implementing Java programs that provides a low-cost solution for running Java programs for consumer appliances.

SUMMARY OF THE INVENTION

The present invention generally relates to a Java hardware accelerator which can be used to quickly translate Java bytecodes into native instructions for a central processing unit (CPU). The hardware accelerator speeds up the processing of the Java bytecodes significantly because it removes the bottleneck which previously occurred when the Java Virtual Machine is run in software on the CPU to translate Java bytecodes into native instructions.

In the present invention, at least part of the Java Virtual Machine is implemented in hardware as the Java hardware accelerator. The Java hardware accelerator and the CPU can be put together on a single semiconductor chip to provide an embedded system appropriate for use with commercial appliances. Such an embedded system solution is less expensive than a powerful superscalar CPU and has a relatively low power consumption.

The hardware Java accelerator can convert the stack-based Java bytecodes into a register-based native instructions on a CPU. The hardware accelerators of the present invention are not limited for use with Java language and can be used with any stack-based language that is to be converted to register-based native instructions. Also, the present invention can be used with any language that uses instructions, such as bytecodes, which run on a virtual machine.

BRIEF DESCRIPTION OF THE DRAWINGS

The present invention may be further understood from the following description in conjunction with the drawings.

FIG. 1 is a diagram of the system of the present invention including the hardware Java accelerator.

FIG. 2 is a diagram illustrating the use of the hardware Java accelerator of the present invention.

FIG. 3 is a diagram illustrating some the details of a Java hardware accelerator of one embodiment of the present invention.

FIG. 4 is a diagram illustrating the details of one embodiment of a Java accelerator instruction translation in the system of the present invention.

FIG. 5 is a diagram illustration the instruction translation operation of one embodiment of the present invention.

FIG. 6 is a diagram illustrating the instruction translation system of one embodiment of the present invention using instruction level parallelism.

FIGS. 7A-7D are tables showing the possible lists of bytecodes which can cause exceptions in a preferred embodiment.

DETAILED DESCRIPTION OF THE PREFERRED EMBODIMENTS

FIG. 1 is a diagram of the system 20 showing the use of a hardware Java accelerator 22 in conjunction with a central processing unit 26. The Java hardware accelerator 22 allows part of the Java Virtual Machine to be implemented in hardware. This hardware implementation speeds up the processing of the Java byte codes. In particular, in a preferred embodiment, the translation of the Java bytecodes into native processor instructions is at least partially done in the hardware Java accelerator 22. This translation has been part of a bottleneck in the Java Virtual Machine when implemented in software. In FIG. 1, instructions from the instruction cache 24 or other memory is supplied to the hardware Java accelerator 22. If these instruction are Java bytecode, the hardware Java accelerator 22 can convert these bytecodes into native processor instruction which are supplied through the multiplexer 28 to the CPU. If a non-Java code is used, the hardware accelerator can be by-passed using the multiplexer 26.

The Java hardware accelerator can do, some or all of the following tasks:

1. Java bytecode decode;
2. identifying and encoding instruction level parallelism (ILP), wherever possible;
3. translating bytecodes to native instructions;
4. managing the Java stack on a register file associated with the CPU or as a separate stack;
5. generating exceptions on instructions on predetermined Java byte codes;
6. switching to native CPU operation when native CPU code is provided;
7. performing bounds checking on array instructions; and
8. managing the variables on the register file associated with the CPU.

In a preferred embodiment, the Java Virtual Machine functions of bytecode interpreter, Java register, and Java stack are implemented in the hardware Java accelerator. The garbage collection heap and constant pool area can be maintained in normal memory and accessed through normal memory referencing.

The major advantages of the Java hardware accelerator is to increase the speed in which the Java Virtual Machine operates, and allow existing native language legacy applications, software base, and development tools to be used. A dedicated microprocessor in which the Java bytecodes were the native instructions would not have access to those legacy applications.

Although the Java hardware accelerator is shown in FIG. 1 as separate from the central processing unit, the Java hardware accelerator can be incorporated into a central processing unit. In that case, the central processing unit has a Java hardware accelerator subunit to translate Java bytecode into the native instructions operated on by the main portion of the CPU.

FIG. 2 is a state machine diagram that shows the operation of one embodiment of the present invention. Block 32 is the power-on state. During power-on, the multiplexer 28 is set to bypass the Java hardware accelerator. In block 34, the native instruction boot-up sequence is run. Block 36 shows the system in the native mode executing native instructions and by-passing the Java hardware accelerator.

In block 38, the system switches to the Java hardware accelerator mode. In the Java hardware accelerator mode, Java bytecode is transferred to the Java hardware accelerator 22, converted into native instructions then sent to the CPU for operation.

The Java accelerator mode can produce exceptions at certain Java bytecodes. These bytecodes are not processed by the hardware accelerator 22 but are processed in the CPU 26. As shown in block 40, the system operates in the native mode but the Java Virtual Machine is implemented in the CPU which does the bytecode translation and handles the exception created in the Java accelerator mode.

The longer and more complicated bytecodes that are difficult to handle in hardware can be selected to produce the exceptions. FIG. 7 is a table-showing one possible list of bytecodes which can cause exceptions in a preferred embodiment.

FIG. 3 is a diagram illustrating details of one embodiment of the Java hardware accelerator of the present invention. The Java hardware accelerator includes Java accelerator instruction translation hardware 42. The instruction translation Unit 42 is used to convert Java bytecodes to native instructions. One embodiment of the Java accelerator instruction translation hardware 42 is described in more detail below with respect to FIG. 4. This instruction translation hardware 42 uses data stored in hardware Java registers 44. The hardware Java Registers store the Java Registers defined in the Java Virtual Machine. The Java Registers contain the state of the Java Virtual Machine, affect its operation, and are updated after each bytecode is executed. The Java registers in the Java virtual machine include the PC, the program counter indicating what bytecode is being executed; Optop, a pointer to the top of the operand stack; Frame, a pointer to the execution environment of the current method; and Vars, a pointer to the first local variable available of the currently executing method. The virtual machine defines these registers to be a single 32-bit word wide. The Java registers are also stored in the Java stack which can be implemented as the hardware Java stack 50 or the Java stack can be stored into the CPU associated register file.

In a preferred embodiment, the hardware Java registers 44 can include additional registers for the use of the instruction translation hardware 42. These registers can include a register indicating a switch to native instructions and a register indicating the version number of the system.

The Java PC can be used to obtain bytecode instructions from the instruction cache 24. In one embodiment the Java PC is multiplexed with the normal program counter 54 of the central processing unit 26 in multiplexer 52. The normal PC 54 is not used during the operation of the Java hardware bytecode translation. In another embodiment, the normal program counter 54 is used as the Java program counter.

The Java registers are a part of the Java Virtual Machine and should not be confused with the general registers 46 or 48 which are operated upon by the central processing unit 26. In one embodiment, the system uses the traditional CPU register file 46 as well as a Java CPU register file 48. When native code is being operated upon the multiplexer 56 connects the conventional register file 46 to the execution logic 26c of the CPU 26. When the Java hardware accelerator is active, the Java CPU register file 48 substitutes for the conventional CPU register file 46. In another embodiment, the conventional CPU register file 46 is used.

As described below with respect to FIGS. 3 and 4, the Java CPU register file 48, or in an alternate embodiment the conventional CPU register file 46, can be used to store portions of the operand stack and some of the variables. In this way, the native register-based instructions from the Java accelerator instruction translator 42 can operate upon the operand stack and variable values stored in the Java CPU register file 48, or the values stored in the conventional CPU register file 46. Data can be written in and out of the Java CPU register file 48 from the data cache or other memory 58 through the overflow/underflow line 60 connected to the memory arbiter 62. The overflow/underflow transfer of data to and from the memory to can done concurrently with the CPU operation. Alternately, the overflow/underflow transfer can be done explicitly while the CPU is not operating. The overflow/underflow bus 60 can be implemented as a tri-state bus or as two separate buses to read data in and write data out of the register file when the Java stack overflows or underflows.

The register files for the CPU could alternately be implemented as a single register file with native instructions used to manipulate the loading of operand stack and variable values to and from memory. Alternately, multiple Java CPU register files could be used: one register file for variable values, another register file for the operand stack values, and another register file for the Java frame stack holding the method environment information.

The Java accelerator controller (co-processing unit) 64 can be used to control the hardware Java accelerator, read in and out from the hardware Java registers 44 and Java stack 50, and flush the Java accelerator instruction translation pipeline upon a "branch taken" signal from the CPU execute logic 26c.

The CPU 26 is divided into pipeline stages including the instruction fetch 26a, instruction decode 26b, execute logic 26c, memory access logic 26d, and writeback logic 26e. The execute logic 26c executes the native instructions and thus can determine whether a branch instruction is taken and issue the "branch taken" signal.

FIG. 4 illustrates an embodiment of a Java accelerator instruction translator which can be used with the present invention. The instruction buffer 70 stores the bytecode instructions from the instruction cache. The bytecodes are sent to a parallel decode unit 72 which decodes multiple bytecodes at the same time. Multiple bytecodes are processed concurrently in order to allow for instruction level parallelism. That is, multiple bytecodes may be converted into a lesser number of native instructions.

The decoded bytecodes are sent to a state machine unit 74 and Arithmetic Logic Unit (ALU) 76. The ALU 76 is provided to rearrange the bytecode instructions to make them easier to be operated on by the state machine 74. The state machine 74 converts the bytecodes into native instructions using the look-up table 78. Thus, the state machine 74 provides an address which indicates the location of the desired native instruction in the look-up table 78. Counters are maintained to keep a count of how many entries have been placed on the operand stack, as well as to keep track of the top of the operand stack. In a preferred embodiment, the output of the look-up table 78 is augmented with indications of the registers to be operated on at line 80. The register indications are from the counters and interpreted from bytecodes. Alternately, these register indications can be sent directly to the Java CPU register file 48 shown in FIG. 3.

The state machine 74 has access to the Java registers in 44 as well as an indication of the arrangement of the stack and variables in the Java CPU register file 48 or in the conventional CPU register file 46. The buffer 82 supplies the translated native instructions to the CPU.

The operation of the Java hardware accelerator of one embodiment of the present invention is illustrated in FIGS. 5 and 6. FIG. 5, section I shows the instruction translation of the Java bytecode. The Java bytecode corresponding to the mnemonic iadd is interpreted by the Java virtual machine as an integer operation taking the top two values of the operand stack, adding them together and pushing the result on top of the operand stack. The Java translating machine translates the Java bytecode into a native instruction such as the instruction ADD R1, R2. This is an instruction native to the CPU indicating the adding of value in register R1 to the value in register R2 and the storing of this result in register R2. R1 and R2 are the top two entries in the operand stack.

As shown in FIG. 5, section II, the Java register includes a PC value of "Value A" that is incremented to "Value A+1". The Optop value changes from "Value B" to "Value B−1" to indicate that the top of the operand stack is at a new location. The Vars value which points to the top of the variable list is not modified. In FIG. 5, section III, the contents of a Java CPU register file, such as the Java CPU register file 48 in FIG. 3, is shown. The Java CPU register file starts off with registers R0-R5 containing operand stack values and registers R6-R7 containing variable values. Before the operation of the native instruction, register R1 contains the top value of the operand stack. Register R6 contains the first variable. After the execution of the native instruction, register R2 now contains the top value of the operand stack. Register R1 no longer contains a valid operand stack value and is available to be overwritten by a operand stack value from the memory sent across the overflow/underflow line 60 or from the bytecode stream.

FIG. 5, section IV shows the memory locations of the operand stack and variables which can be stored in the data cache 58 or in main memory. For convenience, the memory is illustrated without illustrating any virtual memory scheme. Before the native instruction executes, the address of the top of the operand stack, Optop, is "Value B". After the native instruction executes, the address of the top of the operand stack is "Value B−1" containing the result of the native instruction. Note that the operand stack value "4427" can be written into register R1 across the overflow/underflow line 60. Upon a switch back to the native mode, the data in the Java CPU register file 48 should be written to the data memory.

Consistency must be maintained between the Hardware Java Registers 44, the Java CPU register file 48 and the data memory. The CPU 26 and Java Accelerator Instruction Translation Unit 42 are pipelined and any changes to the hardware java registers 44 and changes to the control information for the Java CPU register file 48 must be able to be undone upon a "branch taken" signal. The system preferably uses buffers (not shown) to ensure this consistency. Additionally, the Java instruction translation must be done so as to avoid pipeline hazards in the instruction translation unit and CPU.

FIG. 6 is a diagram illustrating the operation of instruction level parallelism with the present invention. In FIG. 6 the Java bytecodes iload_n and iadd are converted by the Java bytecode translator to the single native instruction ADD R6, R1. In the Java Virtual Machine, iload_n pushes the top local variable indicated by the by the Java register VAR onto the operand stack.

In the present invention the Java hardware translator can combine the iload_n and iadd bytecode into a single native instruction. As shown in FIG. 6, section II, the Java Register, PC, is updated from "Value A" to "Value A+2". The Optop value remains "value B". The value Var remains at "value C".

As shown in FIG. 6, section III, after the native instruction ADD R6, R1 executes the value of the first local variable stored in register R6, "1221", is added to the value of the top of the operand stack contained in register R1 and the result stored in register R1. In FIG. 6, section IV, the Optop value does not change but the value in the top of the register contains the result of the ADD instruction, 1371.

The Java hardware accelerator of the present invention is particularly well suited to a embedded solution in which the hardware accelerator is positioned on the same chip as the existing CPU design. This allows the prior existing software base and development tools for legacy applications to be used. In addition, the architecture of the present embodiment is scalable to fit a variety of applications ranging from smart cards to desktop solutions. This scalability is implemented in the Java accelerator instruction translation unit of FIG. 4. For example, the lookup table 78 and state machine 74 can be modified for a variety of different CPU architectures. These CPU architectures include reduced instruction set computer (RISC) architectures as well as complex instruction set computer (CISC) architectures. The present invention can also be used with superscalar CPUs or very long instruction word (VLIW) computers.

While the present invention has been described with reference to the above embodiments, this description of the preferred embodiments and methods is not meant to be construed in a limiting sense. For example, the term Java in the specification or claims should be construed to cover successor programming languages or other programming languages using basic Java concepts (the use of generic instructions, such as bytecodes, to indicate the operation of a virtual machine). It should also be understood that all aspects of the present invention are not to be limited to the specific descriptions, or to configurations set forth herein. Some modifications in form and detail the various embodiments of the disclosed invention, as well as other variations in the present invention, will be apparent to a person skilled in the art upon reference to the present disclosure. It is therefore contemplated that the following claims will cover any such modifications or variations of the described embodiment as falling within the true spirit and scope of the present invention.

We claim:

1. A method, comprising:
    decoding and processing both Virtual Machine instructions and register-based instructions in a CPU having an execution unit and a register file; wherein the Virtual Machine and register-based instructions are in a shared instruction cache; and wherein the Virtual Machine stack operands are stored in the CPU's register file; wherein for said processing, a common program counter stored in a register in the register file is used for the Virtual Machine and register-based instructions; and wherein in respect of the Virtual Machine instructions, producing register indications for the register file; and
    generating a branch taken indication to facilitate the processing of Virtual Machine and register-based instructions; wherein the branch taken signal flushes a virtual machine instruction pipeline.

2. The method of claim 1, wherein a top of operand stack pointer for the virtual machine operand stack is stored in the CPU register file.

3. The method of claim 1, wherein the CPU performs array bounds checking for Virtual Machine array instructions.

4. The method of claim 1, further comprising receiving from a branch taken indicator, an indication for flushing at least part of a pipeline associated with processing the Virtual Machine instructions.

5. The method of claim 1, further comprising maintaining counters to keep a count of how many entries have been placed on the operand stack, for the Virtual Machine instructions in the register file for the CPU.

6. The method of claim 5, wherein the operands are moved between the register file and memory due to at least one of an overflow and underflow condition.

7. The method of claim 1 wherein variables are moved between the register file and memory.

8. The method of claim 7, wherein one of operands and variables are moved between the register file and memory via one of a load and store operation.

9. The method of claim 1 wherein the CPU includes a register to indicate which instructions are to be processed.

10. A central processing unit (CPU) capable of decoding both Virtual Machine instructions and register-based instructions, the CPU comprising:
    at least an execution unit, capable of processing both Virtual Machine instructions and register-based instructions;
    a shared instruction cache to store the Virtual Machine and register-based instructions;
    a register file associated with the CPU to at least store Virtual Machine stack operands; wherein said processing includes (a) storing a common program counter in a register in the register file for the Virtual Machine and register-based instructions; (b) in respect of the Virtual Machine instructions, producing register indications for the register file; and (c) generating a branch taken indication to facilitate the processing of Virtual Machine and register-based instructions; wherein the branch taken signal flushes a Virtual Machine instruction pipeline.

11. The CPU of claim 10, wherein said processing comprises storing a top of operand stack pointer for the Virtual Machine operand stack in the register file.

12. The CPU of claim 10, wherein said processing comprises performing array bounds checking for Virtual Machine array instructions.

13. The CPU of claim 10, wherein said processing further comprises maintaining counters to keep a count of how many entries have been placed on the operand stack, for the Virtual Machine instructions in the register file.

14. The CPU of claim 13, wherein said processing further comprises moving the operands between the register file and memory due to at least one of an overflow and underflow condition.

15. The CPU of claim 10, wherein said processing further comprises moving variables between the register file and memory.

16. The CPU of claim 15, wherein one of operands and variables are moved between the register file and memory via one of a load and store operation.

17. The CPU of claim 10, wherein the CPU includes a register to indicate which instructions are to be processed.

18. The CPU of claim 10, wherein said processing comprises receiving from a branch taken indicator, an indication for flushing at least part of a pipeline associated with processing the Virtual Machine instructions.

* * * * *